United States Patent
Ostermann (10) Patent No.: US 7,148,889 B1
(45) Date of Patent: *Dec. 12, 2006

(54) SYSTEM AND APPARATUS FOR CUSTOMIZING A COMPUTER ANIMATION WIREFRAME

(75) Inventor: Joern Ostermann, Morganville, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/236,259

(22) Filed: Sep. 27, 2005

Related U.S. Application Data (63) Continuation of application No. 09/877,066, filed on Jun. 11, 2001, now Pat. No. 6,989,834, which is a continuation-in-part of application No. 09/357,233, filed on Jul. 20, 1999, now Pat. No. 6,304,264, which is a continuation of application No. 08/867,727, filed on Jun. 3, 1997, now Pat. No. 5,969,721.

(51) Int. Cl.
*G06T 15/00* (2006.01)
(52) U.S. Cl. ...................... 345/419; 345/473
(58) Field of Classification Search ................ 345/419, 345/420, 421, 473, 474
See application file for complete search history.

(56) References Cited

U.S. PATENT DOCUMENTS

| | | | |
|---|---|---|---|
| 5,844,562 A | 12/1998 | Harrison | |
| 5,852,442 A | 12/1998 | Morito | |
| 5,867,175 A | 2/1999 | Katzenberger et al. | |
| 5,880,743 A | 3/1999 | Moran et al. | |
| 5,969,721 A * | 10/1999 | Chen et al. | ................. 345/419 |
| 6,229,913 B1 | 5/2001 | Nayar et al. | |
| 6,304,264 B1 * | 10/2001 | Chen et al. | ................. 345/419 |

OTHER PUBLICATIONS

Sigeo Morishima, et al., "A media Conversion form Speech to Facial Image for Intelligent Man-Machine Interface", May 4, 1991, IEEE Journal, vol. 9, No. 4.
Y. Lee, et al., "Constructing Physics-based Facial Models of Individuals" Porceedingd of Graphics Interface, Jan. 1, 1993, pp. 1-8.
T. Akimoto, et al., "3D Facial Model Creation Using Generic Model and Front and Side Views of Face", IEICE Transactions on Information and Systems, vol. E75-D, No. 2, Mar. 1, 1992, pp. 191-197.
G. Xu, et al., "Three-Dimensional Face Modeling for Virtual Space Teleconferencing Systems", Transactions of the Institute of Electronics, Information and Communication Engineers of Japan, vol. E73, No. 10, Oct. 1, 1990, pp. 1753-1761.
M. Patel, et al., "Faces: Facial Animation, Construction and Editing System", Eurographics, Vienna, Sep. 2-6, 1991, No. Conf. 12, Sep. 2, 1991, pp. 33-34.

* cited by examiner

*Primary Examiner*—Phu K. Nguyen (57) ABSTRACT

An animation wireframe is modified with three-dimensional (3D) range and color data having a corresponding shape surface. The animation wireframe is vertically scaled based on distances between consecutive features within the 3D range and color data and corresponding distances within the generic animation wireframe. For each animation wireframe point, the location of the animation wireframe point is adjusted to coincide with a point on the shape surface. The shape surface point lies along a scaling line connecting the animation wireframe point, the shape surface point and an origin point. The scaling line is within a horizontal plane.

21 Claims, 9 Drawing Sheets

SYSTEM AND APPARATUS FOR CUSTOMIZING A COMPUTER ANIMATION WIREFRAME

RELATED APPLICATIONS

This application is a continuation of U.S. patent application Ser. No. 09/877,066 filed Jun. 11, 2001, which is a continuation-in-part (CIP) of U.S. patent application Ser. No. 09/357,233, filed Jul. 20, 1999, now U.S. Pat. No. 6,304,264, which is a continuation of U.S. patent application Ser. No. 08/867,727, filed Jun. 3, 1997, now U.S. Pat. No. 5,969,721.

TECHNICAL FIELD

The present invention is generally directed to computer animation. Specifically, the present invention is directed to customizing a computer animation wireframe with three-dimensional range and color data or with a two-dimensional representation and a depth map.

BACKGROUND OF THE INVENTION

Known systems can provide generic computer animations that integrate audio and visual information. For example, these generic computer animations typically display a talking head of a human or of a cartoon animal. These generic computer animations can be used for a number of applications.

For example, some known systems display the computer animation on a computer video monitor to interface with a human user. Other known systems can convert ASCII (American Standard Code for Information Interchange) text into synthetic speech and synchronized talking-head video with realistic lip and jaw movements.

These known computer animations are based on generic animation wireframe models. Although these generic animation wireframe models are generic in the sense that the animations do not represent a specific person; these generic models can be deformed according to a predefined set of parameters to vary the presentation from the one generic version. Deforming a generic animation wireframe model can be used to more closely resemble realistic and natural interactions, for example, human-to-human interactions. Deforming the generic model using a predefined set of parameters, however, cannot sufficiently modify the generic model to present actual people recognized by the viewer.

To produce more realistic and natural displays for human interactions, animation wireframe models should incorporate real measurements of the structure of the desired face, as well as color, shape and size. Such information can be obtained by a three-dimensional laser scanner system that scan a person's head to produce very dense range data and color data of the head.

Some known systems that incorporate measured three-dimensional information into generic animation wireframe models, however, suffer from several shortcomings. In general, accurately modifying generic animation wireframe models with measured three-dimensional range data requires extensive and expensive manual adjustments or automated computer-based adjustments. Manual adjustments of generic animation wireframe models can be time consuming and/or can require expensive human personal with specialized training. Automated adjustments of generic animation wireframe models can require expensive computer equipment that is generally cost-prohibitive for mass distribution and may require extensive maintenance performed by human personnel with specialized training.

SUMMARY OF THE INVENTION

The present invention modifies a generic animation wireframe model with measured three-dimensional range data to produce a customized animated wireframe. The present invention can also modify a generic animation wireframe model with a depth map and image to produce a customized animated wireframe. The image can be a convention 2D image where each pel corresponds to the appropriate surface color of the face (color or black and white). The depth map is a 2D image where each pel represents the absolute or relative distance between the face model and the camera when the depth map was acquired. The present invention produces the customized animated wireframe without requiring extensive manual adjustments or elaborate computer equipment.

The present invention modifies an animation wireframe having multiple points with three-dimensional (3D) range data. The 3D range data has a corresponding shape surface. The animation wireframe is vertically scaled based on the distances between consecutive features within the 3D range data. For each animation wireframe point, the location of the animation-wireframe point is horizontally adjusted to correspond to a point on the shape surface within a horizontal plane.

The vertical scaling factors can be calculated based on the distances between certain points within the 3D range data. A primary point within the 3D range data corresponding to a first feature within the plurality of features can be obtained. A vertical alignment line based on the primary point can be obtained. Secondary points within the 3D range data corresponding to features that lie along the vertical alignment line can be obtained. Consequently, vertical scaling factors based on the distances between consecutive features can be calculated.

A tertiary point within the 3D range data can be selected to define a vertical cutoff plane. For each animation wireframe point, the origin point within the horizontal plane can also be defined. The primary point, the secondary points and the tertiary point can be obtained manually or automatically.

In another embodiment of the invention, a similar result can be accomplished by using a a depth map acquired with a range finder. The scanner can consist of an active range finder using structured light or a laser measuring the time of flight. Alternatively, the scanner can be passive, using stereo or depth-from-defocus. In any case, the scanner system will produce a depth map and the color data (image) showing the texture of the face. In this embodiment, the scanner can associate the depth map with the animation wireframe to ascertain the relative depth of each point on the shape surface. Since the depth map does not distinguish between parts that belong to the object of interest (here a face), the face needs to be segmented in the depthmap. In one preferred embodiment, a depth map is created when the face is relatively far away from the range finder such that all points of a depth map beyond a given threshold are considered background and the remaining point are considered as the face. Since the depth map only defines the frontal distances for the animation wireframe, the scanner scales the back of the animation wireframe such that the outline of the face model as defined by the depthmap is preserved. With a proper alignment, the above-outlined method can be implemented to determine, for example, the primary point, the secondary point, the vertical alignment line as well as the vertical scaling factor. In another embodiment of the present invention, horizontal scaling can be performed by defining a scaling line within the horizontal plane. The scaling line can be defined as containing the animation-wireframe point and an origin point. A shape-surface point is determined as the intersection of the scaling line and the shape surface. The location of the animation-wireframe point can be adjusted to correspond to the shape-surface point. This process can be repeated for each wireframe-animation point.

In an alternative embodiment, horizontally scaling can be performed by selecting a pair of animation-wireframe points within the same horizontal plane and then defining two individual scaling lines. Two shape-surface points can be determined as the two scaling lines and the shape surface. The location of the two animation-wireframe points are then horizontally adjusted to correspond to the two shape-surface points.

Two animation-wireframe points can be adjusted so that $L_W'/L_W$ substantially equals $L_R'/L_R$, where $L_W'$ is the length of a first line connecting the first animation wireframe point and the second animation wireframe point along the animation wireframe within the horizontal plane, $L_W$ is the length of a second line along the animation wireframe within the horizontal plane, the second line being between the limit of the horizontal plane and a first intersection point where the animation wireframe within the horizontal plane intersects a perpendicular line containing the origin point and being perpendicular from the limit of the horizontal plane, $L_R'$ is the length of a third line connecting the first shape-surface point and the second shape-surface point along the shape surface within the horizontal plane, and $L_R$ is the length of a fourth line along the shape surface within the horizontal plane, the fourth line being between the limit of the horizontal plane and a second intersection point where the shape surface within the horizontal plane intersects the perpendicular line.

Texture mapping can be provided to the animation wireframe based on color data corresponding to the 3D range data. In an alternative embodiment, an alignment point within the 3D range data can be obtained corresponding to an object within the animation wireframe that substantially moves during animation. The alignment point can be matched with the corresponding point within the animation wireframe.

DETAILED DESCRIPTION

Figure 1:
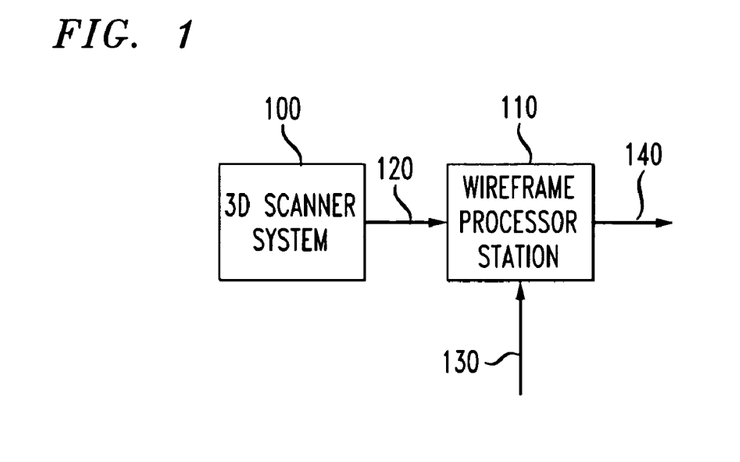
FIG. 1 illustrates a system for customizing a computer animation wireframe according to an embodiment of the present invention.

FIG. 1 illustrates a system for customizing a computer animation wireframe according to an embodiment of the present invention. Three-dimensional (3D) scanner system 100 is connected to wireframe processor station 110.

3D scanner system 100 can be any type of range sensor system that produces 3D range and color data of an object, such as a human head. 3D scanner system 100 can include, for example, a low intensity laser source, a mirror assembly, an imaging optics subsystem, a CCD (charge coupled device) video range and color sensor, and supporting electronics. The supporting electronics can include a processor, a computer-readable memory and input port to be coupled to the CCD sensor and output port to be coupled to wireframe processor station 110 and a databus that connects the processor, the computer readable memory, the input port and the output port. An example of 3D scanner system 100 is the Cyberware 3030 by Cyberware of Monterey, Calif. Other 3D scanner systems exist that scan only the face portion of the head and then construct the entire head based on the 3D data of the face.

It should be noted that FIG. 1 is directed to an embodiment of the invention wherein a 3D representation of the object is used with a 3D scanner. It will be understood by an ordinary skill artisan that a scanner (range finder) or a 3D scanner (range finder) can be used with the embodiments of the invention utilizing a depth map and the associated color data (image). The process descsribed below identifies points like the tip of the nose in the face of person represented by the 3D range data. In case of a depth map showing the face of a person, the same method can be applied. However, only points on the depth map that belong to the face are considered. Hence, we assume that the depth map is segmented into face/non-face regions as described above.

Wireframe processor station 110 receives 3D range and color data 120 from 3D scanner system 100. Wireframe processor station 110 also receives generic animation wireframe data 130. Wireframe data 130 can be provided by any type of device, such as another processor station or a storage device, where wireframe data 130 can be stored for later retrieval. Wireframe processor station 110 can include a processor, a computer-readable memory, a first input port coupled to 3D scanner system 100, a second input port which receives the generic animation wireframe, an output port which sends the fitted animation wireframe and a databus connecting the processor, the computer-readable memory, the first input port, the second input port and the output port. Wireframe processor station 110 can be, for example, an O²™ Desktop Workstation manufactured by Silicon Graphics Computer Systems. Wireframe processor station 110 operates specialized software, including software that performs the method of the present invention whereby wireframe processor station 110 modifies generic animation wireframe data 130 with 3D range and color data 120 to produce fitted animation wireframe 140.

Once wireframe processor station 110 has produced fitted animation wireframe 140, fitted animation wireframe 140 can be used for any of the applications that otherwise support the generic animation wireframe models. Fitted animation wireframe 140 can be sent to another processor (not shown) where such applications can be executed or can be sent to storage device (not shown) for later use.

For convenience of notation, the Cartesian coordinate system can be used to describe the orientation of the wireframes, wireframe data, and 3D range and color data. For a front perspective of wireframe, the vertical axis can be referred to as the y-axis and the horizontal axis can be referred to as the x-axis. For a profile perspective of the wireframe where the head is facing to the left, the vertical axis again can be referred to as the y-axis and the horizontal axis can be referred to as the z-axis. Although the Cartesian coordinate system is used herein to discuss the wireframes, wireframe data and 3D range and color data, any other coordinate system, such as spherical or cylindrical coordinate systems, is also applicable.

Wireframe processor station 110 can include a processor, a computer readable memory, a first input port to be coupled to 3D scanner system 100 and receiving 3D range and color data 120, a second input port receiving generic animation wireframe data 130, an output port sending fitted animation wireframe 140 and a databus connecting the processor, the computer readable memory, the first input port, the second input port and the output port.

Figure 2A:
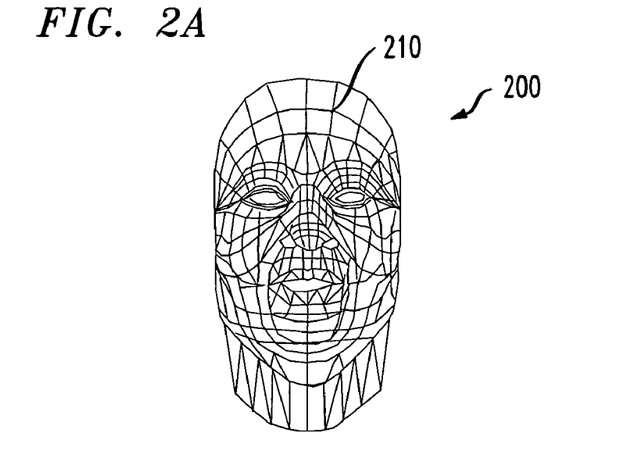
FIGS. 2A and 2B illustrate an example of a generic animation wireframe that can be produced from generic animation wireframe data.
Figure 2B:
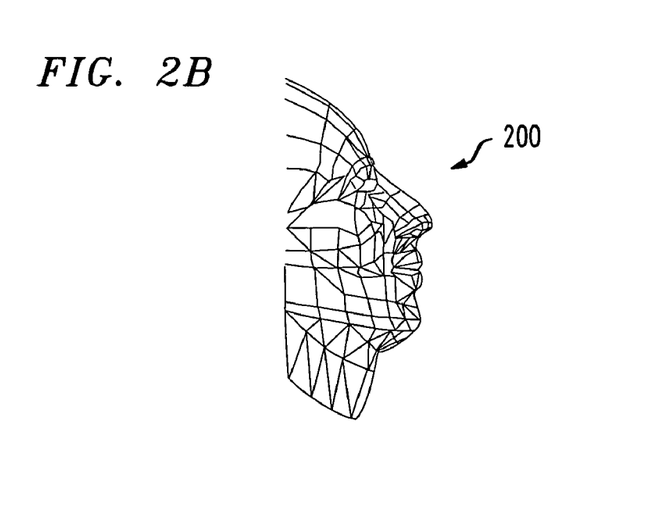

FIGS. 2A and 2B illustrate an example of generic animation wireframe 200 that can be produced from generic animation wireframe data 130. FIG. 2A shows a front perspective of the generic animation wireframe 200; FIG. 2B shows a profile perspective of generic animation wireframe 200. Generic animation wireframe 200 comprises a number of 3D data points connected to form segments of the wireframe. For example, point 210 illustrates one 3D data point connected within the wireframe; point 210 is connected to four other points and is part of four different rectangular wireframe plates. The term "plate" is used herein to refer to the area of a wireframe outlined by the segments that connect the points on the wireframe. The plates can be of any size, orientation and shape, including planar and non-planar shapes.

Figure 3:
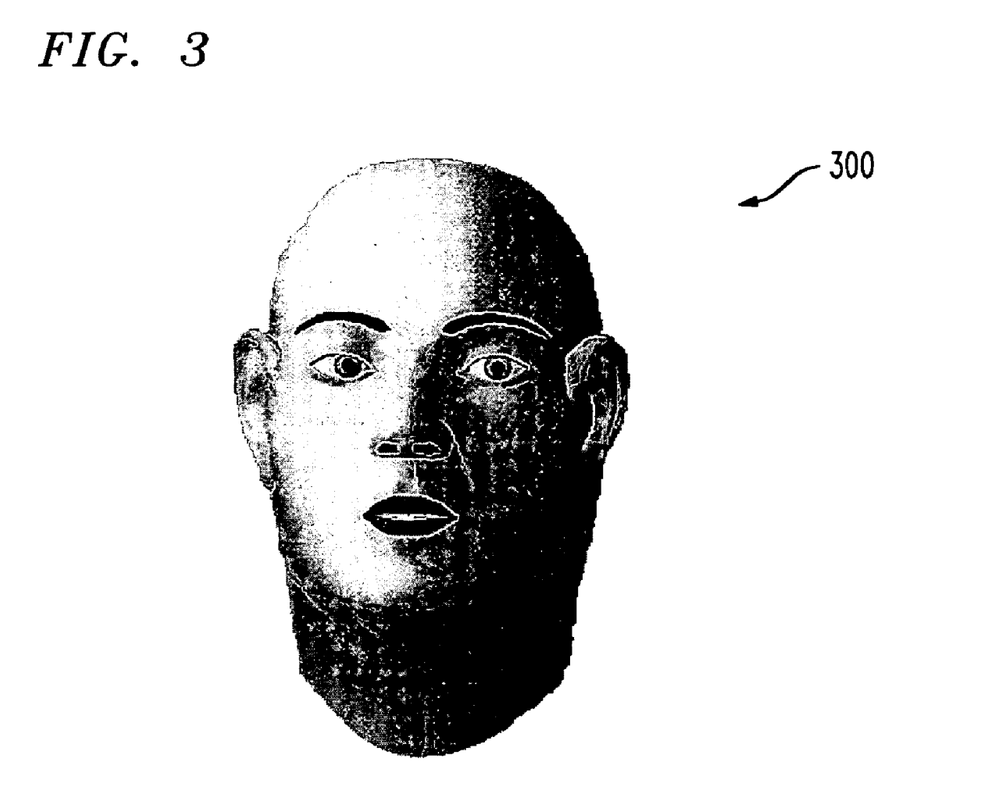
FIG. 3 illustrates an example of the generic animated wireframe with smooth shading.

FIG. 3 illustrates an example of the generic animated wireframe with smooth shading. Smooth-shaded generic animated wireframe 300 comprises generic animated wireframe 200 where each wireframe segment is filled in with an appropriate shading color that provides a 3D perspective for the animation wireframe data.

Figure 4A:
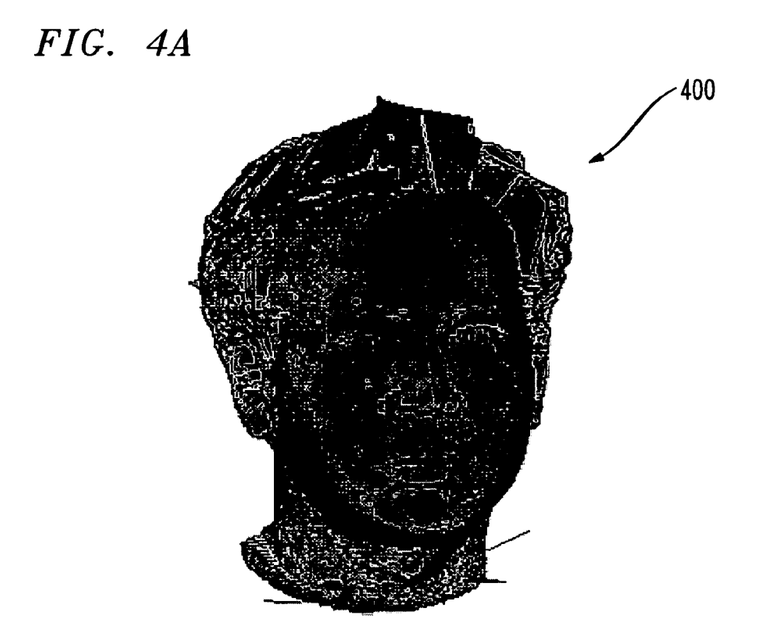
FIGS. 4A and 4B illustrate an example of a display of based on measured three-dimensional range data.
Figure 4B:
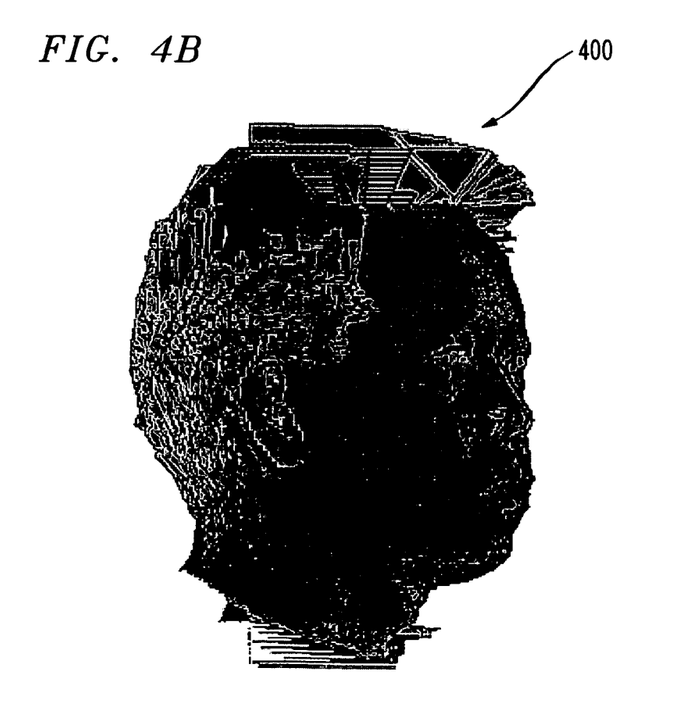

FIGS. 4A and 4B illustrate an example of a display of animated wireframe based on measured 3D range data. FIG. 4A shows a front perspective of display 400 based on the 3D range data from 3D range and color data 120. FIG. 4B shows a profile perspective of display 400 based on the 3D range data from 3D range and color data 120.

Figure 5A:
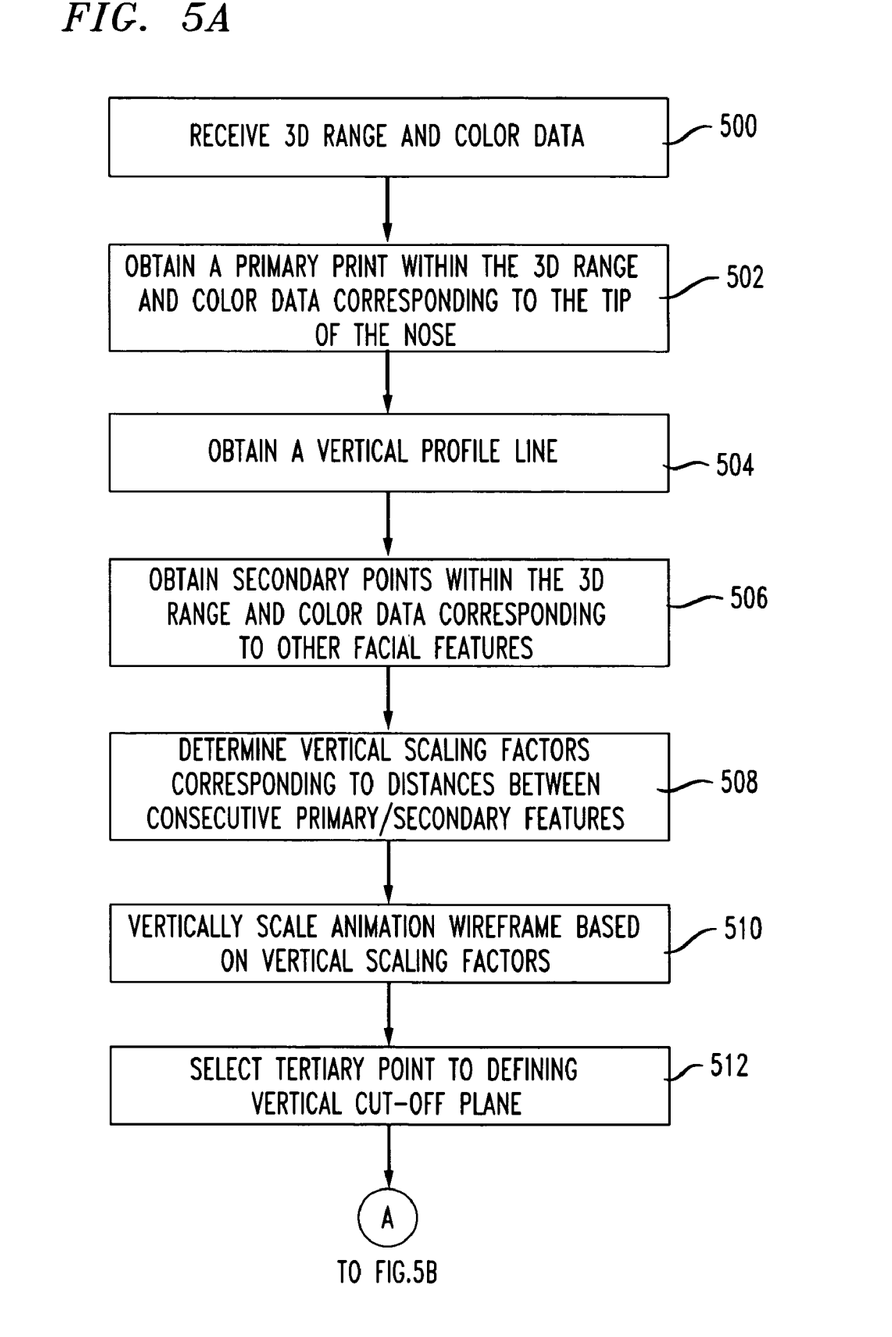
FIGS. 5A and 5B illustrate a method for modifying the generic animation wireframe with the three-dimensional range and color data according to an embodiment of the present invention.
Figure 5B:
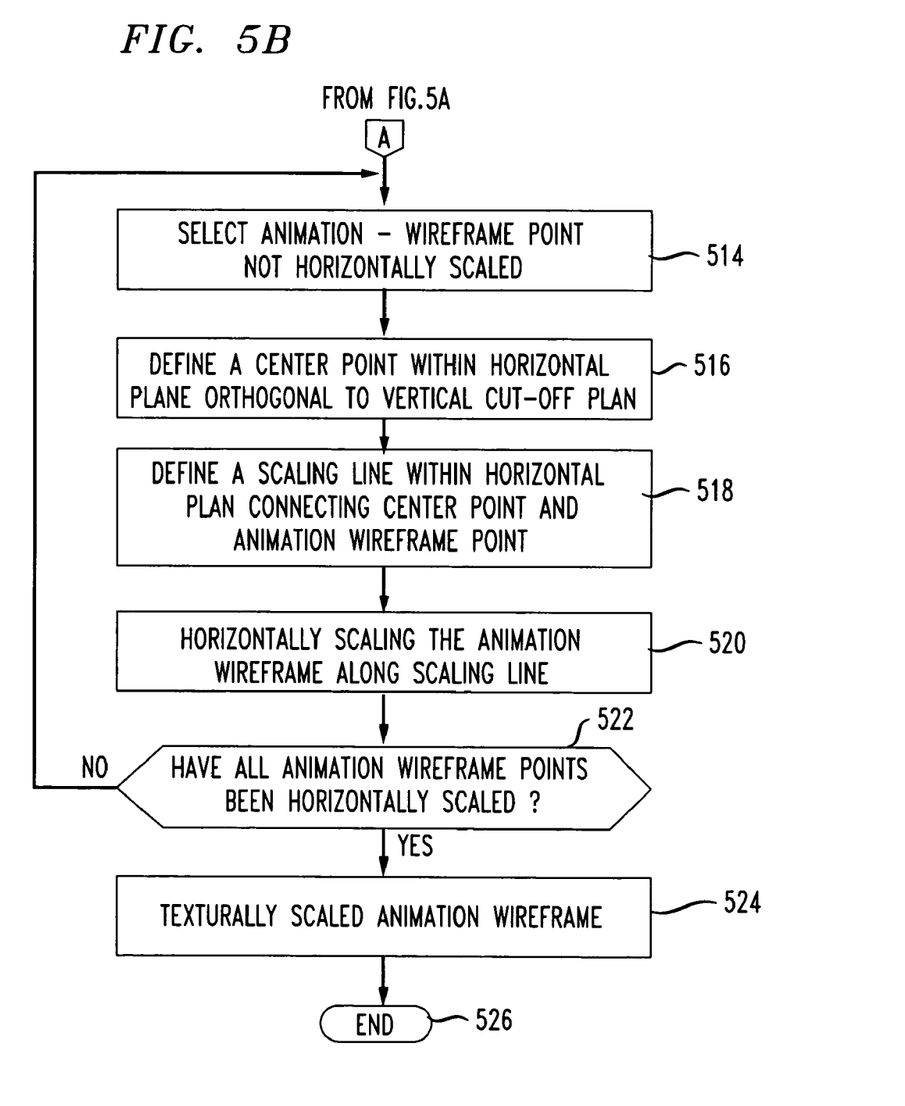

FIGS. 5A and 5B illustrate a method for modifying the generic animation wireframe with the 3D range data according to an embodiment of the present invention. The method begins at step 500 where wireframe processor station 110 receives 3D range and color data 120 from 3D scanner system 100. The method described in FIGS. 5A and 5B assumes that the 3D range and color data 120 provided by 3D scanner system 100 is vertically aligned with generic animation wireframe 200. This vertical alignment can be obtained by keeping the subject to be scanned vertically aligned. Suggested wording: In the embodiment of the invention using a depth map and color data, the depth map and the color data need to be aligned to provide the best results.

In step 502, a primary point within 3D range and color data 120 is obtained. The primary point is the point within 3D range and color data 120 that can be most easily recognized automatically by wireframe processor station 110. For example, the primary point can be the point in 3D range and color data 120 that corresponds to the nose tip of the subject. This primary point can be easily obtained automatically by wireframe processor station 110 because the tip of the subject's nose generally extends the furthest in the direction corresponding to the object's view. This primary point can also be obtained manually by an operator using an input device (not shown) connected to wireframe processor station 110.

In an embodiment of the invention wherein a depth map is used, a primary point can be obtained by wireframe processor with reference to the depth map. That is, the primary point can be selected as the point on the depth map that protrudes outwardly more than any other point on the depth map. This point, could be the tip of the subject's nose.

Figure 6A:
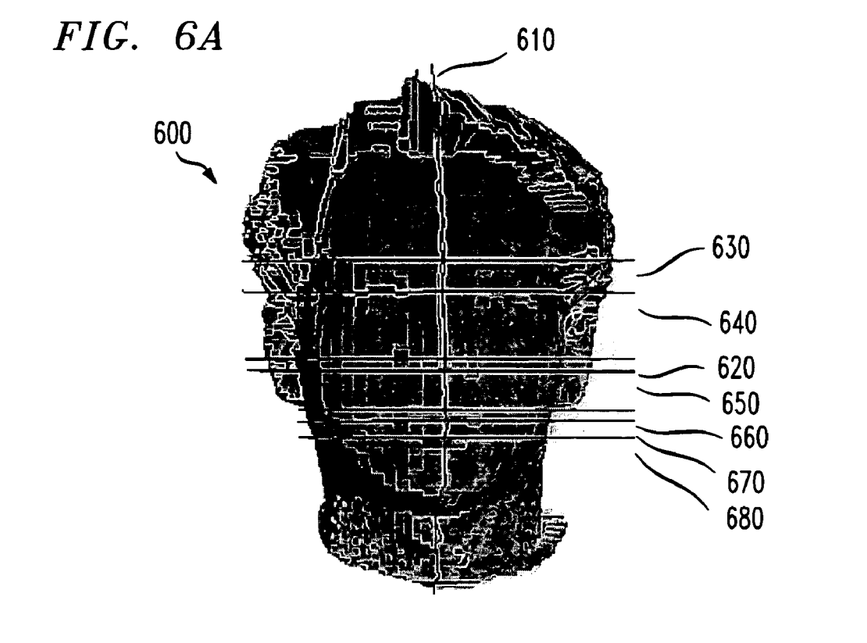
FIGS. 6A and 6B show an example of a display of the three-dimensional range data with the vertical profile line and with lines showing the primary point and the secondary points.
Figure 6B:
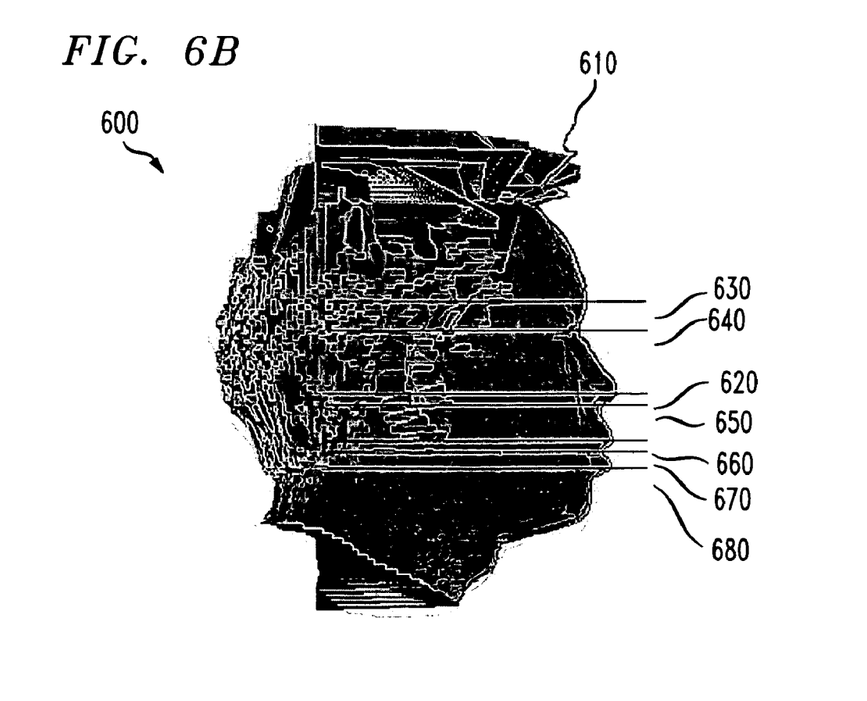

In step 504, a vertical profile line is obtained. From the front perspective of the display of 3D range and color data 120, the vertical profile line is drawn parallel to the y-axis through the primary point. Because 3D range and color data 120 was presumably obtained vertically aligned, the vertical profile line will run vertically along the middle of the subject's head. See for example FIGS. 6A and 6B. FIG. 6A shows a front view of display 600 of the 3D range data from 3D range and color data 120; FIG. 6B shows a profile view of display 600 of the 3D range data from 3D range and color data 120. The vertical profile line is shown as line 610 and runs vertically across display 600 of 3D range and color data 120 intersecting the primary point (i.e., the tip of the nose).

A similar step can be implement with a depth map. In this embodiment, a vertical profile line is drawn parallel to the y-axis through the primary point. If the depth map is properly aligned with the 2D (or 3D) representation, the vertical profile line would run vertically along the middle of the subject's head.

In step 506, secondary points corresponding to other facial features are obtained. Secondary points are points within 3D range and color data 120, other than the primary point, that can be most easily recognized automatically by wireframe processor station 110. Returning to FIGS. 6A and 6B, the secondary points are the points which lie along the vertical profile line 610 and are shown as lines 630–680. A horizontal line 620 is also shown perpendicular to the vertical line 610 and includes the primary point or the tip of the nose. With a similar approach secondary points can also be ascertained from a depth map.

Line 640 indicates the secondary point above the primary point (shown as line 620) which is a relative minimum with respect to the z-axis; this secondary point can be described as the location of the bridge of the nose. Line 630 indicates the secondary point above line 640 which is a relative maximum with respect to the z-axis; this secondary point can be described as the lower edge of the forehead. Line 650 indicates the secondary point which is a relative minimum with respect to the z-axis that is immediately below the primary point (shown as line 620); this secondary point can be described as the bottom of the nose and the upper section of the upper lip. Line 660 indicates the secondary point which is the first relative maximum with respect to the z-axis that is below the primary point (shown as line 620); this secondary point can be described as the furthest point of the upper lip. Line 680 indicates the secondary point which is the second relative maximum with respect to the z-axis that is below the primary point (shown as line 620; this secondary point can be described as the furthest point of the lower lip. Line 670 indicates the secondary point that is a relative minimum with respect to the z-axis between lines 660 and 680; this secondary point can be described as the mouth opening.

In step 508, vertical scaling factors are determined based on the ratio of the distances between the consecutive secondary points (including the primary point) within generic animation wireframe 200 and within the 3D range data from 3D range and color data 120. In other words, one vertical scaling factor is based on the vertical distance between lines 630 which represents the lower edge of the forehead and line 640 which represents the bridge of the nose and based on the corresponding vertical distance for generic wireframe 200. Another vertical scaling factor is determined based on the distance between line 640, the bridge of the nose, and line 620, the tip of the nose, and based on the corresponding distance for generic animation wireframe 200. The remaining vertical scaling factors are based on the distances between lines 620 and 650, lines 650 and 660, lines 660 and 670, and lines 670 and 680, and based on, respectively, the corresponding distances for generic animation wireframe 200. With reference to a depth map, vertical scaling factor can be determined based on the ratio of secondary points (including the primary point) within a generic animation wireframe and a depth map. For example, a vertical scaling factor can be based on the vertical distance between the point representing the lower edge of the forehead and a point representing the bridge of the nose on the depth map.

In step 510, generic animation wireframe 200 is vertically scaled based on the vertical scaling factors that were calculated using either a 3D range and color data 120 or a depth map and color data. The points on generic animation wireframe 200 that correspond to the secondary points of 3D range and color data 120 can be previously predetermined. In other words, the tip of the nose, the bridge of the nose and the other facial features are previously determined for generic animation wireframe 200. Alternatively, points on generic wireframe that correspond to the secondary points of 3D range (or the depth map) and color data can be determined automatically by wireframe processor station 110 using, for example, a method similar to that described above with respect to steps 500 to 510.

A horizontal slice of generic animation wireframe 200 is then vertically scaled using the vertical scaling factor that corresponds to the appropriate pair of facial features. In other words, a horizontal slice of generic animation wireframe 200 between the tip of the nose and the bridge of the nose is vertically scaled using the vertical scaling factor that is based upon the distance between lines 620 which indicates the tip of the nose in 3D range or in the depth map and color data 120 (or other compatible representation) and line 640 which indicates the bridge of the nose in 3D range and color data 120. Similarly, the remaining horizontal slices of generic animation wireframe 200 are vertically scaled using the appropriate vertical scaling factor.

In step 512, a tertiary point is selected to define a vertical cutoff plane for the resulting vertically-scaled wireframe. This tertiary point can be selected manually by a human operator or automatically by wireframe processor station 110. The tertiary point can be selected at approximately halfway between the profile view of the vertically-scaled wireframe along the z-axis, i.e., around the ear. Step 512 need only be performed where the application requires the front view of the fitted wireframe animation. The method illustrated in FIGS. 5A and 5B, however, can be extended to fit 3D range and color data 120 to the entire animation wireframe, including the back of animation wireframe. This method can also be applied to fitting data from depth map and color data or any other cooperating representation.

Each point in the vertically-scaled animation wireframe is then horizontally scaled to more closely match 3D range (or the depth map) and color data 120 (or any cooperating representation). This process of horizontally scaling every point in the vertically-scaled animation wireframe is performed for each point individually until all the points in the wireframe are horizontally scaled.

Steps 514 to 522 illustrate a method, according to an embodiment of the present invention, by which each individual point in the wireframe can be horizontally scaled. In step 514, a point in the vertically-scaled animation wireframe that has not already been selected for horizontal scaling is selected. In step 516, a center point within a horizontal plane that includes the selected animation wireframe point is defined. This horizontal plane is orthogonal to the vertical cut-off plane.

Figure 7:
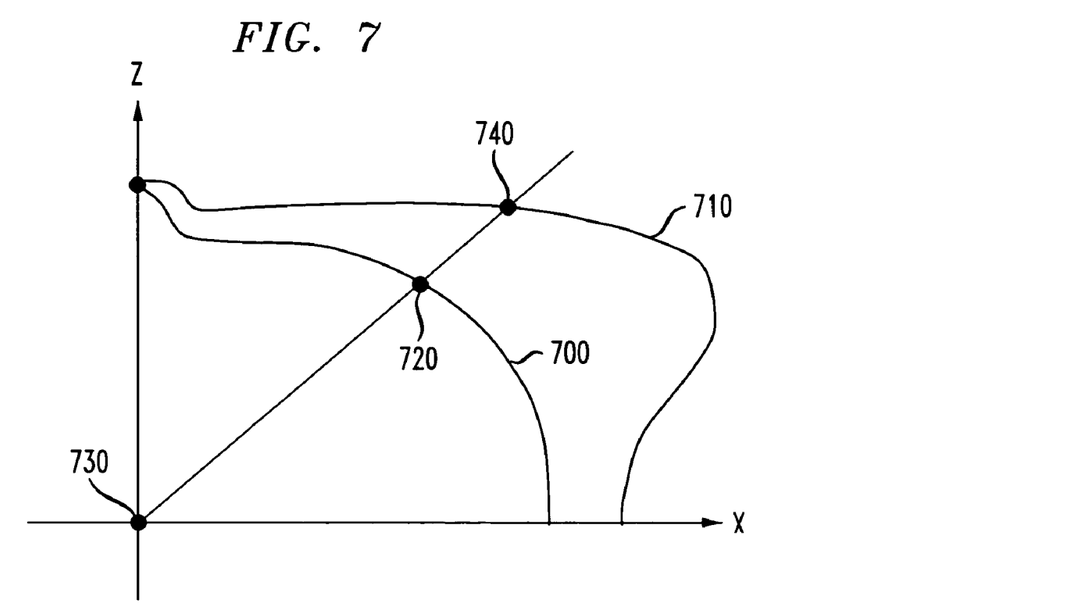
FIG. 7 illustrates the horizontal plane within which a selected animation-wireframe point is horizontally scaled according to an embodiment of the present invention.

FIG. 7 illustrates the horizontal plane within which the selected animation-wireframe point is horizontally scaled, according to an embodiment of the present invention. As shown in FIG. 7, the vertical axis corresponds to the z-axis, the horizontal axis corresponds to the x-axis, and the y-axis corresponds to an axis coming out of the page. Line 700 indicates the shape of a portion of the vertically-scaled animation wireframe. Line 710 indicates the shape of a portion of a line constructed from 3D range and color data 120. The selected animation wireframe point is shown as point 720. The defined center point within the horizontal plane is shown as point 730.

In step 518, a scaling line within the horizontal plane can be defined by connecting center point 730 with selected animation wireframe point 720. The scaling line also intersects the 3D range and color data 120 represented by line 710 at point 740. The scaling line may not intercept a 3D range and color data point represented by line 710 at exactly one measured range data point; in such a case, the coordinates of the nearest four 3D range and color data points can be averaged to give a new coordinate for point 740 which is the intersection of the scaling line with line 710, the representation of the 3D range and color data 120.

In step 520, the animation wireframe is horizontally scaled along the scaling line. In other words, the location or coordinates of selected animation wireframe point 720 is redefined to correspond to the location or coordinates of point 740. In conditional step 522, the animation wireframe is checked to determine whether all of the animation wireframe points have been horizontally scaled. If all the animation wireframe points have been horizontally scaled, then the method proceeds to step 524. If all of the animation wireframe points have not been horizontally scaled, then the method continues back to step 514 where steps 514 through 522 are repeated to horizontally scale all the animation wireframe points.

Figure 8:
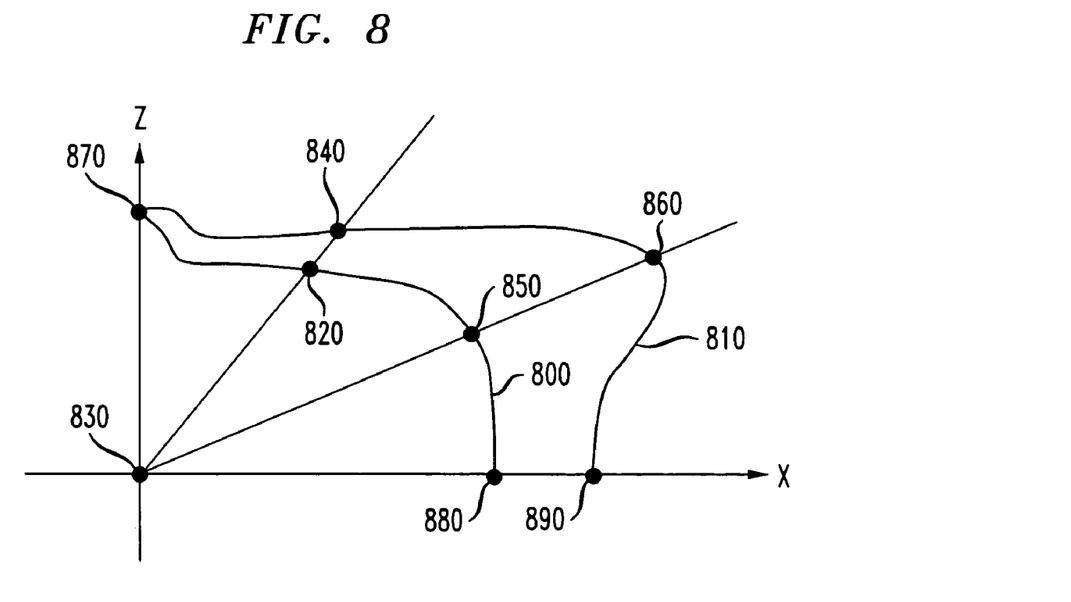
FIG. 8 illustrates the horizontal plane within which a selected animation-wireframe point is horizontally scaled according to another embodiment of the present invention.

FIG. 8 illustrates the horizontal plane within which the selected animation-wireframe point is horizontally scaled according to another embodiment of the present invention. This embodiment of the present invention can be substituted for steps 514 through 522 shown in FIG. 5B. In this alternative embodiment, the animation wireframe is scaled proportionally to match 3D range and color data 120. In other words, each segment of the animation wireframe between the animation wireframe points is scaled proportionally based on 3D range and color data 120.

In FIG. 8, a portion of the animation wireframe is shown by line 800. Line 810 indicates the shape of a portion of a line constructed from 3D range and color data 120. A first scaling line connects the center point 830 with a first selected animation wireframe point 820 and an intersection point on the 3D range data at point 840 on the 3D range data line 810. A second scaling line connects center point 830 with a second selected animation wireframe point 850 and another point 860 on the 3D range data line 810. The point 870 indicates where animation wireframe line 800 and the 3D range data line 810 intersects the z-axis. Note that animation wireframe line 800 and the 3D range data line 810 need not intersect the z-axis at same point. Points 880 and 890 indicate where animation wireframe line 800 and the 3D range data line 810, respectively, intersect the x-axis.

$L_W$ is the length of animation wireframe line 800' between points 870 and 880. $L_R$ is the length of 3D range data line 810 between points 870 and 890. $L_W'$ is the length of the line between points 820 and 850 along line 800. $L_R'$ is the length of the line between points 840 and 860 along line 810. The animation wireframe segment between points 820 and 850 is horizontally scaled so that $L_W'/L_W = L_R'/L_R$. This process is repeated for each segment of the animation wireframe line 800. In this manner, the entire animation wireframe is scaled in proportion to the 3D range data; any distortions that otherwise would be present due to varying lengths of the animation wireframe segments between animation wireframe points is avoided.

Returning to the method described in FIGS. 5A and 5B at step 524, once the animation wireframe has been completely scaled to match the 3D range and color data, the textural shading can be added to the fitted wireframe. Textural shading is the projection of the color imagery from the measured 3D range and color data 120 onto each plate of the fitted animation wireframe. In other words, each plate of the fitted animation wireframe is defined by the collection of fitted wireframe points and the line segments that connect these points. The color contained in the original 3D imagery for a particular group of 3D range data points is projected onto a corresponding plate on the wireframe defined by the same points. Although each plate in the fitted wireframe likely has a different shape, location and orientation than a corresponding plate that can be described by the 3D range and color data, the texture from the original image can easily be pasted onto the fitted animation wireframe because each plate in the fitted animation wireframe is defined by the points of the fitted animation wireframe.

Because the eyes and mouth of the fitted animation wireframe are facial objects that likely move during animation, texture shading of these facial objects should be particularly accurate. To ensure that the color imagery of 3D range and color data 120 is accurately aligned to the fitted animation wireframe, the corners of the eyes and the mouth can be aligned manually by an operator using an input device (not shown) connected to wireframe processor station 110. An operator can manually identify alignments points corresponding to the left and right corners of each eye and the mouth within the color imagery of 3D range and color data 120. Because the points within the fitted animation wireframe corresponding to the selected alignment points are known beforehand, wireframe processor station 110 can align the selected alignment points within the color imagery of 3D range and color data 120 with the corresponding points within the fitted animation wireframe; consequently, the color imagery of 3D range and color data 120 will be accurately aligned to the fitted animation wireframe at least in the vicinity of the eyes and the mouth.

Figure 9A:
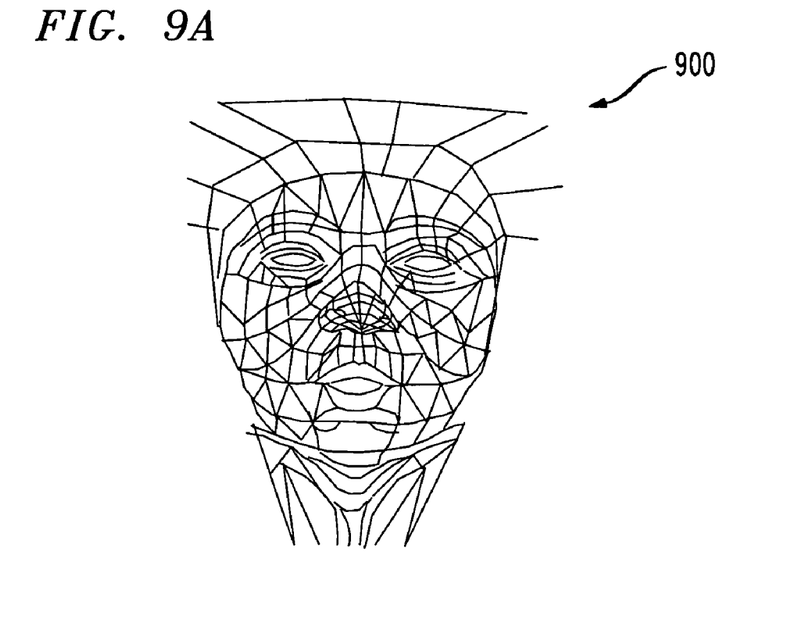
FIGS. 9A and 9B illustrate the fitted animation wireframe resulting from the modification of the generic animation wireframe using the three-dimensional range data.
Figure 9B:
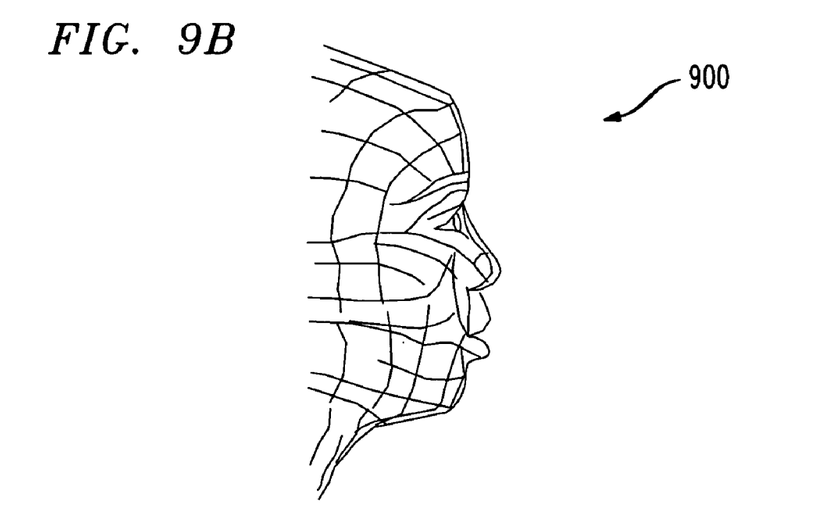

FIGS. 9A and 9B illustrate the fitted animation wireframe resulting from the modification of the generic animation wireframe using the 3D range data; the fitted animation wireframe shown in FIGS. 9A and 9B does not yet have the texture added from the 3D color data. FIG. 9A shows a front perspective of fitted animation wireframe 900. FIG. 9B shows a profile perspective of fitted animation wireframe 900.

Figure 10:
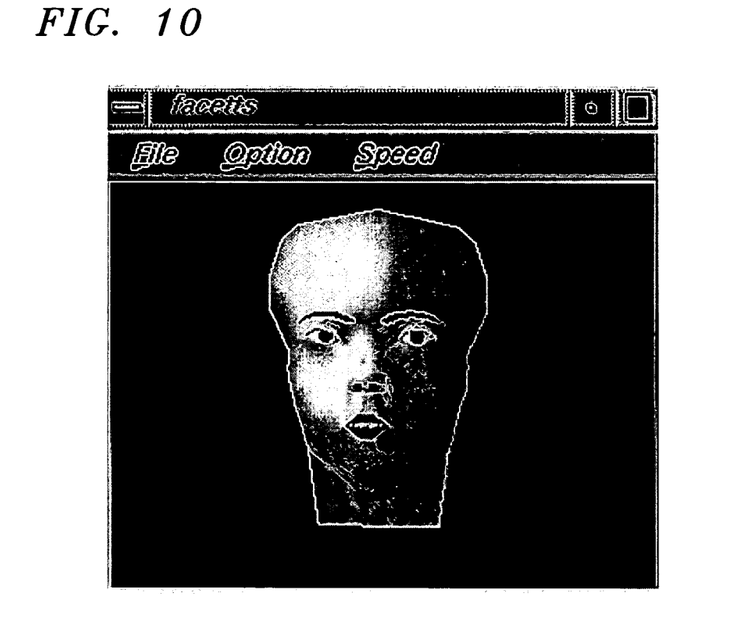
FIG. 10 illustrates a resulting fitted animation wireframe with smooth shading in a front-view perspective.

FIG. 10 illustrates an example of a fitted animation wireframe with smooth shading, in a front perspective view. The fitted animation wireframe with smooth shading is fitted animation wireframe 900. The fitted animation wireframe with smooth shading is provide here for illustrative purposes. A fitted animation wireframe with texture shading provides a more representative animation of the subject scanned by 3D scanner system 100.

Figure 11:
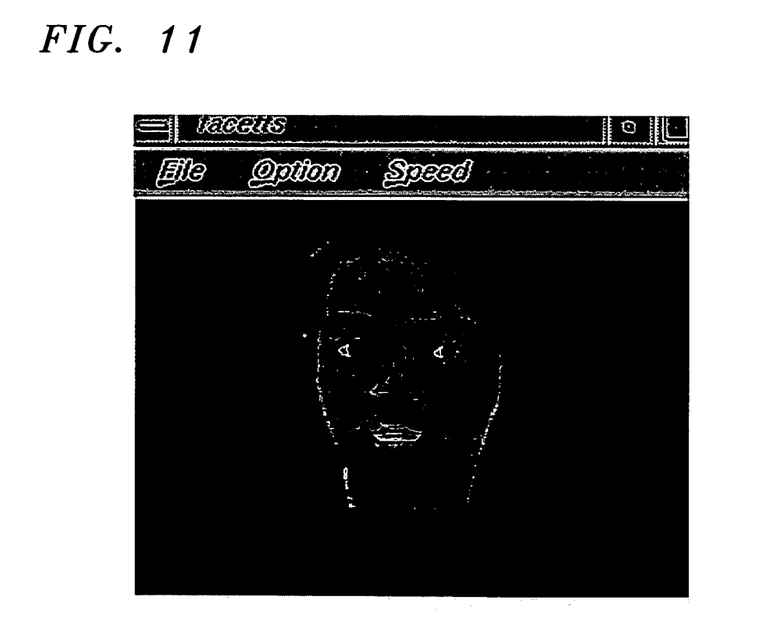
FIG. 11 shows the resulting fitted animation wireframe with texture shading provided by the color information in the measured three-dimensional range and color data.

FIG. 11 shows the same fitted animation wireframe with texture shading provided by the color information in measured 3D range and color data 120, rather than with smooth shading. The resulting fitted animation wireframe with texture shading is a customized version of the generic animation wireframe based on the measured 3D range and color data 120. Now, this fitted animation wireframe with texture shading can be used for any of the applications that support the generic animation wire frame models.

It should, of course, be understood that while the present invention has been described in reference to a particular system configuration and process, other systems and processes should be apparent to those of ordinary skill in the art. For example, although the present invention was described in reference to a human head, the application would be equally applicable to any sort of head such as an animal's head which possess a definable set of facial features for which a set of rules defining the secondary points can be used.

What is claimed is:

1. A method for modifying an animation wireframe having a plurality of points with a two-dimensional (2D) representation having a shape surface or a depth map, comprising:

scaling the animation wireframe in a first direction based on a plurality of distances between feature pairs within a plurality of features, the plurality of features being within the depth map; and adjusting in a second direction the location of a first animation-wireframe point to correspond to a first point on the shape surface.

2. The method of claim 1, wherein said adjusting is performed for a plurality of animation-wireframe points corresponding to points on the shape surface within a plane in a second direction.

3. The method of claim 1, wherein said scaling further comprises the following:

obtaining a primary point within the depth map corresponding to a first feature within the plurality of features;

obtaining an alignment line in the first direction based on the primary point;

obtaining a plurality of secondary points within the depth map corresponding to features within the plurality of features that lie along the alignment line; and calculating a plurality of scaling factors based on the plurality of distances between feature pairs from the plurality of features.

4. The method of claim 3, wherein said obtaining the primary point is performed manually.

5. The method of claim 3, wherein said obtaining the plurality of secondary points is performed manually.

6. The method of claim 3, wherein:
a first secondary point from the plurality of secondary points corresponds to a lower edge of a forehead,
a second secondary point from the plurality of secondary points corresponds to a bridge of the nose,
a third secondary point from the plurality of secondary points corresponds to a bottom of the nose,
a fourth secondary point from the plurality of secondary points corresponds to an upper lip,
a fifth secondary point from the plurality of secondary points corresponds to a mouth opening, and
a sixth secondary point from the plurality of secondary points corresponds to a lower lip.

7. The method of claim 1, wherein said adjusting further includes the following:
defining a scaling line connecting the first animation-wireframe point and an origin point, the scaling line being within a plane in the second direction;
determining a first shape surface point as the intersection of the scaling line and the shape surface; and
adjusting the location of the first animation-wireframe point to coincide with the first shape surface point.

8. The method of claim 1, wherein said adjusting further includes the following:
selecting a tertiary point within the depth map that defines a cut-off plane in the first direction, the cut-off plane in the first direction intersecting with a plane in the second direction to define a limit of the plane in the second direction.

9. The method of claim 8, wherein said obtaining the tertiary point is performed manually.

10. The method of claim 8, wherein said adjusting further includes the following:
defining a first scaling line connecting the first animation-wireframe point and an origin point, the first scaling line being within a plane in the second direction;
determining the first shape surface point as the intersection of the first scaling line and the shape surface;
selecting a second animation wireframe point within the plane in the second direction;
defining a second scaling line connecting the second animation-wireframe point and the origin point, the second scaling line being within the plane in the second direction;
determining the second shape surface point as the intersection of the second scaling line and the shape surface; and
adjusting the location of the second animation wireframe point to correspond to the second shape surface point.

11. The method of claim 10, wherein the location of the first animation wireframe point and the second animation wireframe point are adjusted so that
$L_W'/L_W$ substantially equals $L_R'/L_R$, where:
$L_W'$ is the length of a first line connecting the first animation wireframe point and the second animation wireframe point along the animation wireframe within the plane in the second direction,
$L_W$ is the length of a second line along the animation wireframe within the plane in the second direction, the second line being between the limit of the plane in the second direction and a first intersection point where the animation wireframe within the plane in the second direction intersects a perpendicular line containing the origin point and being perpendicular from the limit of the plane in the second direction,
$L_R'$ is the length of a third line connecting the first shape-surface point and the second shape-surface point along the shape surface within the plane in the second direction, and
$L_R$ is the length of a fourth line along the shape surface within the plane in the second direction, the fourth line being between the limit of the plane in the second direction and a second intersection point where the shape surface within the plane in the second intersects the perpendicular line.

12. The method of claim 1, further comprising:
providing texture mapping to the animation wireframe based on color data corresponding to the depth map.

13. The method of claim 12, further comprising:
obtaining an alignment point within the color data corresponding to an object within the animation wireframe that substantially moves during animation; and
matching the alignment point with a corresponding point within the animation wireframe.

14. The method of claim 1, further comprising:
providing texture mapping to the animation wireframe based on color data corresponding to the 2D representation.

15. An apparatus for modifying an animation wireframe having a plurality of points with a two-dimensional (2D) shape surface representation having a corresponding depth map, comprising:
a processor;
a computer-readable memory coupled to said processor;
a first input port coupled to said processor and to a range sensor system, said first input port receiving 2D representation and the corresponding depth map;
a second input port coupled to said processor, said second input port receiving the animation wireframe;
an output port coupled to said processor for forwarding the modified animation wireframe; and
said processor scaling the animation wireframe in a first direction based on a plurality of distances between feature pairs within a plurality of features, the plurality of features being within the depth map;
said processor adjusting in a second direction the location of a first animation wireframe point to coincide with a point on the shape surface.

16. The apparatus of claim 15, wherein said processor adjusts in the second direction for a plurality of animation-wireframe points corresponding to points on the shape surface within a plane in a second direction.

17. The apparatus of claim 15, wherein the shape surface point lying along a scaling line connecting the animation wireframe point, the shape surface point and an origin point, the scaling line being within a plane in the second direction.

18. The apparatus of claim 15, further comprising:
a first storage device coupled to said second input port, said first storage device sending the animation wireframe to second input port.

19. The apparatus of claim 15, further comprising:
a second storage device coupled to an output device, said second storage device receiving the animation wireframe from said output device.

20. An apparatus for modifying an animation wireframe having a plurality of points with a two-dimensional (2D) representation having a corresponding shape surface and a corresponding depth map, comprising:

means for scaling the animation wireframe in a first direction based on a plurality of distances between consecutive features within a plurality of features, the plurality of features being within the 2D representation; and means for adjusting in a second direction the location of a first animation wireframe point to coincide with a point on the shape surface.

21. The apparatus of claim 20, wherein the shape surface point lying along a scaling line connecting the animation wireframe point, the shape surface point and an origin point, the scaling line being within a plane in a second direction.

* * * * *